United States Patent [19]

Powers

[11] Patent Number: 5,374,087
[45] Date of Patent: * Dec. 20, 1994

[54] TAPPING SLEEVE

[75] Inventor: Edward J. Powers, Aurora, Ill.

[73] Assignee: Pipeline Accessory Marketing, Ltd., Aurora, Ill.

[*] Notice: The portion of the term of this patent subsequent to Aug. 20, 2008 has been disclaimed.

[21] Appl. No.: 734,943

[22] Filed: Jul. 24, 1991

[51] Int. Cl.5 ............................................. F16L 11/12
[52] U.S. Cl. .................... 285/197; 285/156; 285/351; 285/379
[58] Field of Search ............... 285/197, 379, 373, 111, 285/351, 156

[56] References Cited

U.S. PATENT DOCUMENTS

| | | | |
|---|---|---|---|
| 771,306 | 10/1904 | Gregg | 285/379 X |
| 873,689 | 12/1907 | Van Winkle | 285/197 |
| 3,204,665 | 9/1965 | Faint | 285/373 X |
| 3,471,176 | 10/1969 | Gilchrist | 285/111 |
| 3,840,255 | 10/1974 | Daghe | 285/197 X |
| 3,909,011 | 9/1975 | Sheesley | 285/379 X |
| 4,708,373 | 11/1987 | Morriss, Jr. | 285/373 X |
| 4,895,397 | 1/1990 | Miller | 285/419 |
| 5,040,828 | 8/1991 | Kane | 285/197 |

FOREIGN PATENT DOCUMENTS 522560 11/1955 Belgium ........................ 285/379

OTHER PUBLICATIONS

Drawing No. D0703 of Robar Industries Ltd., Showing the Robar 6606 Tapping Sleeve dated Jul. 31, 1981 and published in 1981 (Exhibit A).
Drawing No. A0706 of Robar Industries, Ltd., Showing Saddle Gasket and Retainer Ring of Robar 6606 Tapping Sleeve dated Sep. 15, 1982, published on or about 1982.

*Primary Examiner*—Dave W. Arola
*Attorney, Agent, or Firm*—Timmons & Kelly

[57] ABSTRACT

A tapping sleeve for attaching a branch line to a main fluid conduit. The tapping sleeve has upper and lower sleeve members, bolted together around the main fluid conduit. Shell gaskets seal between the sleeve members and the main fluid conduit and a branch gasket seals around a side opening in the upper sleeve member. Metal shell gasket retaining rings secure the shell gaskets in place and a metal branch gasket retaining ring secures the branch gasket. In the preferred embodiment, the retaining ring has a circular cross section.

4 Claims, 2 Drawing Sheets

TAPPING SLEEVE

BACKGROUND OF THE INVENTION

1. Field of the Invention

This invention relates in general to pipe connectors. In particular, the invention relates to tapping sleeves for use in attaching a branch pipe to a main pipe in a fluid supply system.

2. Description of the Prior Art

U.S. Pat. No. 3,471,176, issued Oct. 7, 1969, to Gilchrist, discloses a tapping sleeve having a circular branch gasket for sealing between the tapping sleeve and the main fluid conduit. The branch gasket extends around a side opening in the tapping sleeve and is located in an inner gasket recess defined by a radially extending flange.

U.S. Pat. No. 4,708,373, issued Nov. 24, 1987, to Morriss, Jr., discloses another type of tapping sleeve. In this patent, the tapping sleeve has a pair of shell gaskets that seal between the tapping sleeve and the main fluid conduit. The shell gaskets cooperate to extend completely around the main fluid conduit.

U.S. patent Ser. No. 07/539,907, filed Jun. 18, 1990, by Kane, discloses a tapping sleeve for attaching a branch line to a main fluid conduit. The Kane sleeve has a pair of sleeve members, with a side branch attached to one of the sleeve members around a side opening in the sleeve member. A branch gasket is located around the side opening in the sleeve member and between the main fluid conduit and the sleeve member. A branch gasket retaining ring extends around the circumference of the branch gasket for preventing excessive movement of the branch gasket in response to fluid pressure in the main conduit. The retaining ring is generally rectangular in cross section and abuts the branch gasket on one side and one of the sleeve members on the other side.

SUMMARY OF THE INVENTION

The tapping sleeve of the invention has upper and lower sleeve members, adapted to be bolted together around a main fluid conduit. A side branch is attached to the upper sleeve member, around a side opening in the upper sleeve member. A branch gasket extends around the side opening in the upper sleeve member and seals between the upper sleeve member and the main fluid conduit.

A branch gasket retaining ring extends around the circumference of the branch gasket. The branch gasket retaining ring prevents excessive movement of the branch gasket in response to fluid pressure in the main fluid conduit. The branch gasket retaining ring is generally circular in cross section and abuts the branch gasket and one of the sleeve members.

The tapping sleeve also has shell gaskets between the sleeve members and the main fluid conduit. Shell gasket retaining rings are connected to the inner circumference of the sleeve members and secure the shell gaskets against excessive movement.

DESCRIPTION OF THE PREFERRED EMBODIMENT

Figure 1:
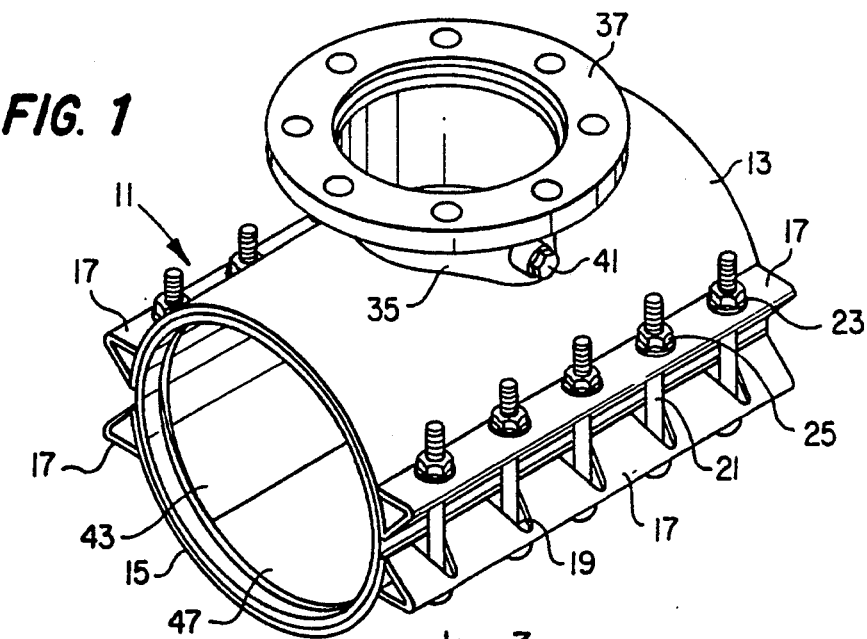
FIG. 1 is a perspective view of a tapping sleeve of the invention.

As shown in the drawings, the preferred embodiment of the invention is a tapping sleeve 11 having an upper sleeve member 13 and a lower sleeve member 15. The two sleeve members 13 and 15 are semi-circular and mate to form a complete circle.

A bolt lug 17 is welded to the each side of each sleeve member 13 and 15. Each bolt lug 17 has a number of holes 19 aligned with corresponding holes 19 in an opposing bolt lug 17 on the other sleeve member 13 or 15. Bolts 21 pass through the aligned holes 19, and washers 23 and nuts 25 on the bolts 21 secure the opposing bolt lugs 17 together.

Figure 2:
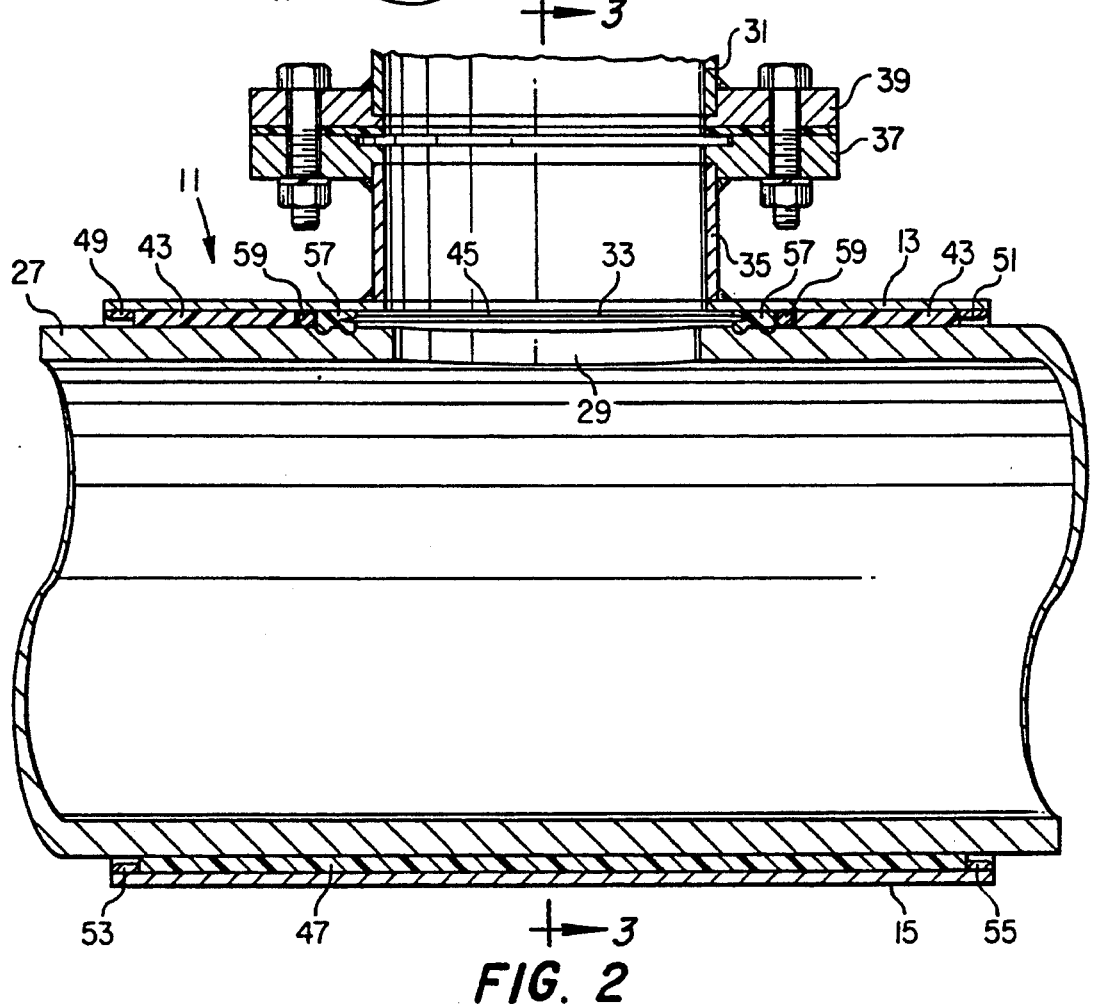
FIG. 2 is a sectional view of the tapping sleeve of the invention as seen along lines 2—2 in FIG. 3.
Figure 3:
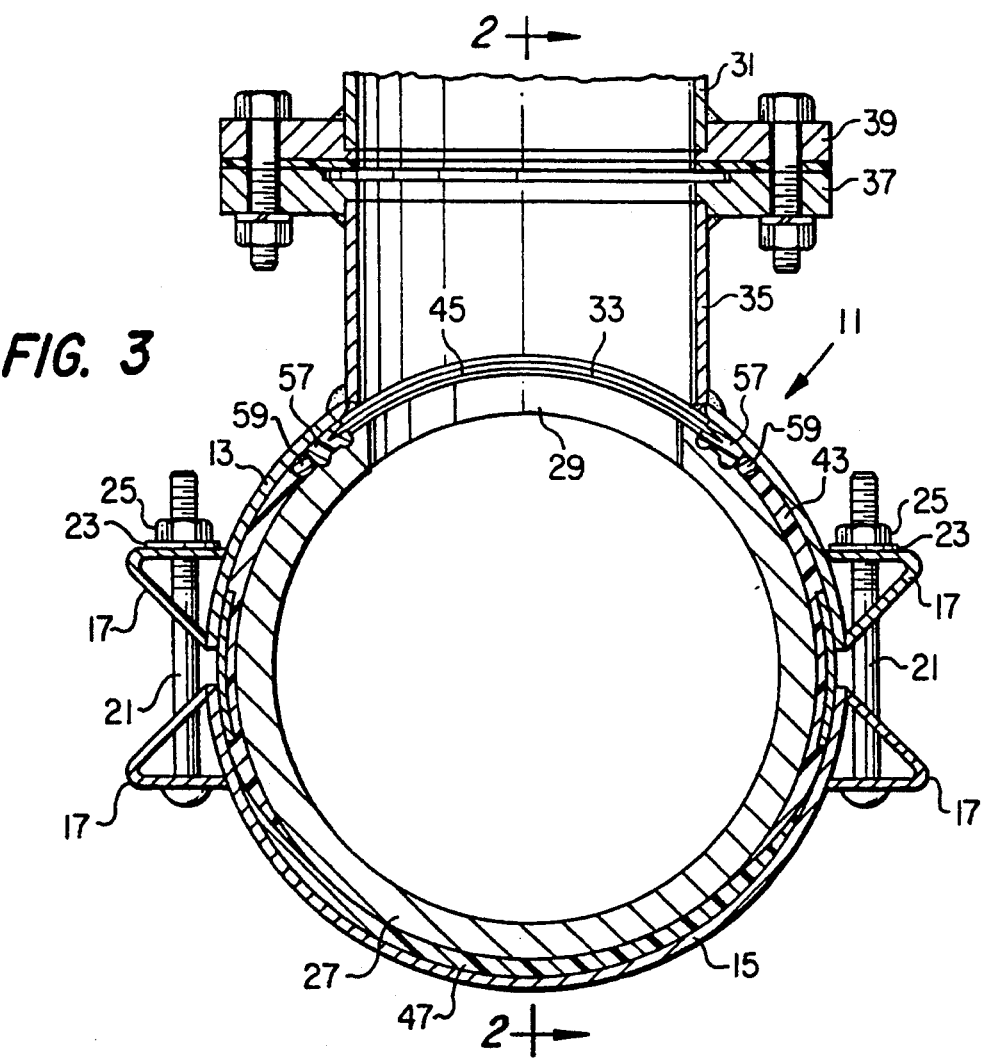
FIG. 3 is a sectional view of the tapping sleeve of the invention, as seen along lines 3—3 in FIG. 2.

The diameter of the sleeve members 13 and 15 is slightly larger than the Outside diameter of a main fluid conduit 27, so that the tapping sleeve 11 fits closely around the main fluid conduit 27, as shown in FIGS. 2 and 3. The main fluid conduit 27 is a standard cylindrical pipe, through which a side opening 29 is drilled to allow fluid to flow into or out of a branch line 31.

The upper sleeve member 13 has a side opening 33. A side branch 35 is attached to the upper sleeve member 13 around the side opening 33.

A flange 37 on the side branch 35 attaches to a flange 39 on the branch line 31 to secure the branch line 31 to the tapping sleeve 11 and to the main fluid conduit 27. Fluid can then flow from the main fluid conduit 27 into the branch line 31. A test plug 41 on the side branch 35 provides access to the interior of the side branch 35 for various test instruments, such as a pressure gauge.

An upper shell gasket 43 is located between the upper sleeve member 13 and the main fluid conduit 27 for sealing fluid pressure between the upper sleeve member 13 and the main fluid conduit 27. The upper shell gasket 43 has an opening 45 aligned with the side opening 29 in the main fluid conduit 27 and the side opening 33 in the upper sleeve member 13.

A lower shell gasket 47 is similarly located between the lower sleeve member 15 and the main fluid conduit 27. The lower shell gasket 47 cooperates with the upper shell gasket 43 to exit end completely around the outer circumference of the main fluid conduit 27.

As shown in FIG. 2, an upper shell gasket retainer 49 and 51 is located at each end of the upper shell gasket 43. The upper shell gasket retainers 49 and 51 are connected to the upper sleeve member 13 and secure the upper shell gasket 43 against pressure in the side branch 35.

Lower shell gasket retainers 53 and 55 are located at each end of the lower shell gasket 47. The lower shell gasket retainers 53 and 55 are connected to the lower sleeve member 15 and secure the lower shell gasket 47 against pressure in the side branch 35. One upper shell gasket retainer 49 and one lower shell gasket retainer 53 cooperate to form a retaining ring 56 that extends completely around the main fluid conduit 27. The other upper shell gasket retainer 51 and the other lower shell gasket retainer 55 cooperate to form a second retaining ring.

As shown in FIGS. 2 and 3, a branch gasket 57 extends around the side opening 35 in the upper sleeve member 13 and seals between the main fluid conduit 27 and the upper sleeve member 13. The branch gasket 57 preferably has a dual lip configuration as described in U.S. Pat. No. 3,471,176, issued Oct. 7, 1969, to Gilchrist.

A branch gasket retaining ring 59 extends around the circumference of the branch gasket 57 for preventing excessive movement of the branch gasket 57 in response to fluid pressure in the main fluid conduit 27. The branch gasket retaining rings the branch gasket 57 and the upper shell gasket 43. As pressure in the main fluid conduit 27 increases, the branch gasket 57 is forced radially outward. The branch gasket retaining ring 59 secures the branch gasket 57 against excessive movement as a result of the pressure.

In operation, the tapping sleeve 11 of the invention is used by placing the upper and lower sleeve members 13 and 15 around a main fluid conduit 27. The holes 19 in the opposing bolt lugs 17 are aligned and the bolt lugs 17 are connected together with bolts 21, washers 23, and nuts 25.

When the sleeve members 13 and 15 are connected around the main fluid conduit 27, the upper and lower shell gaskets 43 and 47 seal between the sleeve members 13 and 15 and the main fluid conduit 27. The branch gasket 57 also seals between the upper sleeve member 13 and the main fluid conduit 27. The branch gasket retaining ring 59 secures the branch gasket 57 and the shell gasket retaining rings 49, 51, 53, and 55 secure the shell gaskets 43 and 47. The effectiveness of the seals can be tested through the test plug 41.

If the seals are effective, the side opening 29 is then drilled through the main fluid conduit 27. The branch line 31 is then attached to the flange 37 on the side branch 35. Fluid in the main fluid conduit 27 can then flow into the branch line 31.

The tapping sleeve 11 of the invention has several advantages over the prior art. The branch gasket retaining ring 59 prevents the deformation failure of the branch gasket 57. Also, the shell gasket retaining rings 49, 51, 53, and 55 prevent failure of the shell gaskets 43 and 47.

The invention has been shown in only one embodiment. It should be apparent to those skilled in the art that the invention is not so limited, but is susceptible to various changes and modifications without departing from the spirit of the invention.

I claim:

1. A tapping sleeve for attaching a branch line to a main fluid conduit, comprising:
    a pair of sleeve members;
    a side branch attached into nine of the sleeve members around a side opening in the sleeve member;
    a connector for connecting the sleeve members together around the main conduit;
    a branch gasket located around the side opening in the sleeve member and between the main fluid conduit and the sleeve member;
    a branch gasket retaining ring extending around the circumference of the branch gasket for preventing excessive movement of the branch gasket in response to fluid pressure in the main conduit, the retaining ring being generally circular in cross section and abutting said branch gasket and one of the sleeve members;
    a shell gasket located between the sleeve members and the main fluid conduit for sealing fluid pressure between the sleeve members and the main fluid conduit; and
    a shell gasket retainer connected to one of the sleeve members for retaining the shell gasket, the retainer abutting the shell gasket on one side and one of he sleeve members on another side.

2. A tapping sleeve as defined in claim 1, further comprising a second shell gasket retainer, wherein the second shell gasket retainer cooperates with the first shell gasket retainer, the retainers abutting the shell gasket on one side and one of said sleeve members on another side and forming a retaining ring that extends completely around the main fluid conduit.

3. A tapping sleeve as defined in claim 2, wherein the shell gasket retainers are generally rectangular in cross section, 4. A tapping sleeve as defined in claim 1, wherein the shell gasket retainer is generally rectangular in cross section.

* * * * *